United States Patent
Bolz et al.

(10) Patent No.: US 8,537,169 B1
(45) Date of Patent: Sep. 17, 2013

(54) GPU VIRTUAL MEMORY MODEL FOR OPENGL

(75) Inventors: Jeffrey A. Bolz, Santa Clara, CA (US); Eric S. Werness, San Jose, CA (US); Jason Sams, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 691 days.

(21) Appl. No.: 12/715,176

(22) Filed: Mar. 1, 2010
(Under 37 CFR 1.47)

(51) Int. Cl.
*G06T 1/00* (2006.01)
*G06F 12/10* (2006.01)

(52) U.S. Cl.
USPC .......................................... 345/522; 345/568

(58) Field of Classification Search
None
See application file for complete search history.

(56) References Cited

U.S. PATENT DOCUMENTS

| | | | | |
|---|---|---|---|---|
| 7,623,134 | B1 * | 11/2009 | Danilak | 345/568 |
| 8,024,547 | B2 | 9/2011 | Lee et al. | |
| 2005/0050216 | A1 | 3/2005 | Stauffer et al. | |
| 2005/0237329 | A1 | 10/2005 | Rubinstein et al. | |
| 2006/0092165 | A1 * | 5/2006 | Abdalla et al. | 345/545 |
| 2006/0149919 | A1 | 7/2006 | Arizpe et al. | |
| 2007/0057957 | A1 * | 3/2007 | Wooten | 345/566 |
| 2007/0076008 | A1 * | 4/2007 | Osborne | 345/541 |
| 2007/0208885 | A1 | 9/2007 | Otsuka | |
| 2008/0074430 | A1 * | 3/2008 | Jiao et al. | 345/506 |
| 2008/0106552 | A1 | 5/2008 | Everitt | |
| 2009/0217252 | A1 | 8/2009 | Aronson et al. | |
| 2010/0058302 | A1 * | 3/2010 | Broscaru et al. | 717/151 |
| 2010/0118041 | A1 | 5/2010 | Chen et al. | |

OTHER PUBLICATIONS

NVIDIA Corporation, Using Vertex Buffer Objects (VBO), Oct. 2003, NVIDIA White Paper, pp. 1-15.*
Lindholm et al., NVIDIA Tesla: A Unified Graphics and Computing Architecture, Apr. 2008, IEEE Micro, vol. 28, No. 2, pp. 1-9.*
Dittamo et al., GPU White Paper, Oct. 2008, University of Pisa, pp. 1-29.*
Office Action dated Oct. 5, 2012, U.S. Appl. No. 12/715,164, filed Mar. 1, 2010, 40 pages.

* cited by examiner

*Primary Examiner* — Daniel Hajnik
*Assistant Examiner* — Anh-Tuan V Nguyen
(74) *Attorney, Agent, or Firm* — Patterson & Sheridan, L.L.P.

(57) ABSTRACT

One embodiment of the present invention sets forth a method for accessing, from within a graphics processing unit (GPU), data objects stored in a memory accessible by the GPU. The method comprises the steps of creating a data object in the memory based on a command received from an application program, transmitting an address associated with the data object to the application program for providing data associated with different draw commands to the GPU, receiving a first draw command and the address associated with the data object from the application program, and transmitting the first draw command and the address associated with the data object to the GPU for processing.

19 Claims, 6 Drawing Sheets

GPU VIRTUAL MEMORY MODEL FOR OPENGL

BACKGROUND OF THE INVENTION

1. Field of the Invention

The present invention relates generally to accessing buffer objects in GPU memory and, more specifically, to a GPU virtual memory model for OpenGL.

2. Description of the Related Art

Graphics languages have evolved in a way that allows an application to replace many of the original state machine variables with blocks of user-defined data. For example, the current vertex state has been augmented by vertex buffer objects, fixed-function shading state and parameters have been replaced by shaders/programs and constant buffer objects. Applications switch between coarse sets of state by binding buffer objects to the application context or to other container objects (e.g. vertex array objects) instead of manipulating state variables of the application context.

In a typical vertex draw flow, an application binds a buffer name associated with a buffer object to the application context, and, in response, a graphics driver looks up the buffer object based on the buffer object name. The application then specifies vertex attributes to be used in the vertex draw operation, and the graphics driver attaches the buffer object to those vertex attributes. Once the application issues a draw command, the graphics driver locks the buffer object in memory and transmits the draw command and the physical address of the buffer object to the GPU for processing. In such an implementation, the graphics driver tracks the usage of the buffer object and unlocks the buffer object once the buffer object is no longer in use.

One drawback to the current usage of buffer objects is that the graphics driver is responsible for keeping track of buffer objects and determining the physical addresses of buffer objects based on the corresponding buffer names. This results in a graphics driver bottleneck involving pointer chases and L2 cache misses that affects the overall performance of a graphics system.

As the foregoing illustrates, what is needed in the art is a mechanism for accessing buffer objects without causing a graphics driver bottleneck.

SUMMARY OF THE INVENTION

One embodiment of the present invention sets forth a method for accessing, from within a graphics processing unit (GPU), data objects stored in a memory accessible by the GPU. The method comprises the steps of creating a data object in the memory based on a command received from an application program, transmitting an address associated with the data object to the application program for providing data associated with different draw commands to the GPU, receiving a first draw command and the address associated with the data object from the application program, and transmitting the first draw command and the address associated with the data object to the GPU for processing.

One advantage of the disclosed method is that the GPU driver does not have to operate on the data objects each time they are used.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
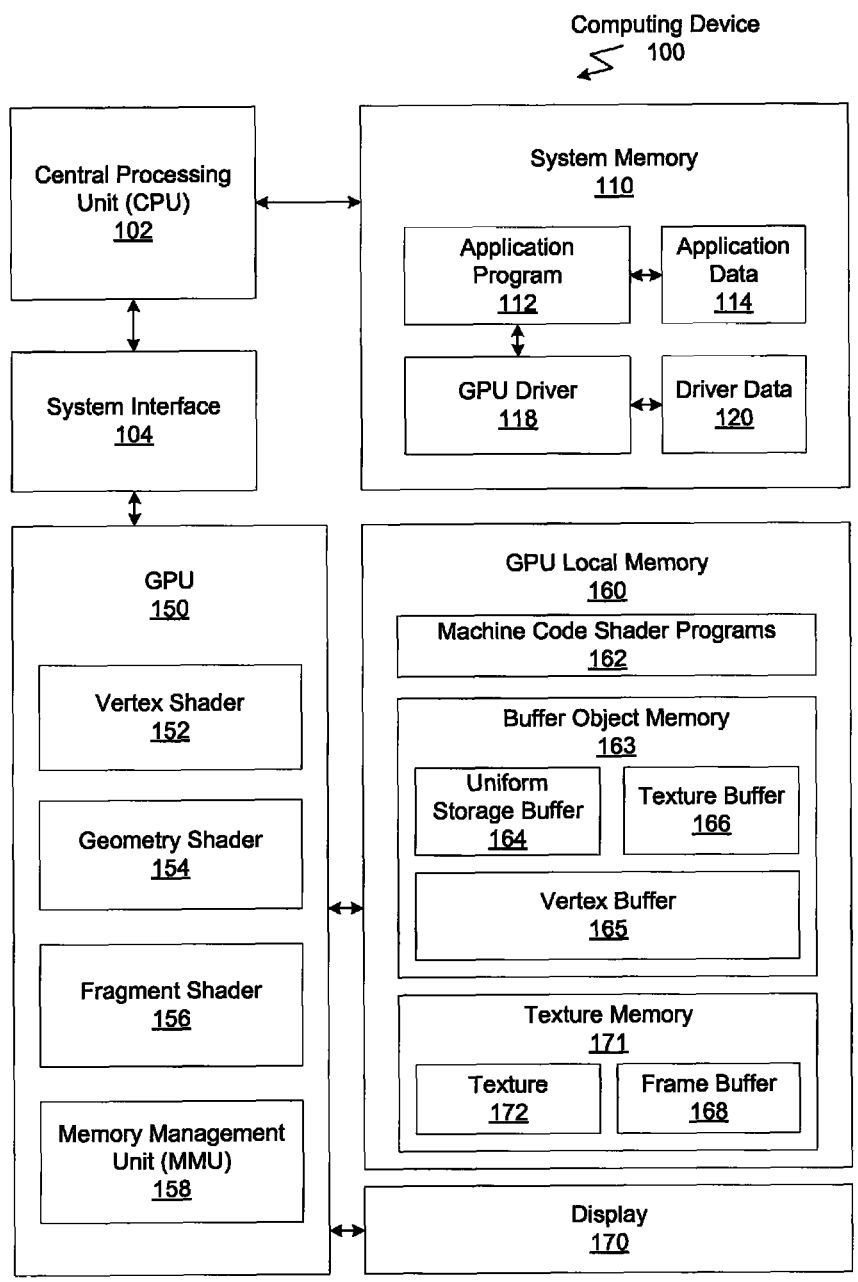
FIG. 1 is a conceptual diagram of a computing device configured to implement one or more aspects of the present invention.

FIG. 1 is a conceptual diagram of a computing device 100 configured to implement one or more aspects of the present invention. The computing device 100 includes a central processing unit (CPU) 102, a system interface 104, a system memory 110, a GPU 150, a GPU local memory 160 and a display 170. The CPU 102 connects to the system memory 110 and the system interface 104. The CPU 102 executes programming instructions stored in the system memory 110, operates on data stored in system memory 110 and communicates with the GPU 150 through the system interface 104, which bridges communication between the CPU 102 and GPU 150. In alternate embodiments, the CPU 102, GPU 150, system interface 104, or any combination thereof, may be integrated into a single processing unit. Further, the functionality of GPU 150 may be included in a chipset of in some other type of special purpose processing unit or co-processor. The system memory 110 stores programming instructions and data for processing by the CPU 102. The system memory 110 typically includes dynamic random access memory (DRAM) configured to either connect directly to the CPU 102 (as shown) or alternately, via the system interface 104. The GPU 150 receives instructions transmitted by the CPU 102 and processes the instructions in order to render graphics data and images stored in the GPU local memory 160. The GPU local memory 160 is any memory space accessible by the GPU 150 including local memory, system memory, on-chip memories, and peer memory. The GPU 150 displays certain graphics images stored in the GPU local memory 160 on the display 170.

The system memory 110 includes an application program 112, application data 114, a GPU driver 118 and GPU driver data 120. The application program 112 generates calls to a graphics API in order to produce a desired set of results, typically in the form of a sequence of graphics images. The application program 112 also transmits one or more high-level shading programs to the graphics API for processing within the GPU driver 118. The high-level shading programs are typically source code text of high-level programming instructions that are designed to operate on one or more shaders within the GPU 150. The graphics API functionality is typically implemented within the GPU driver 118.

The GPU local memory 160 includes a set of machine code shader programs 162, a buffer object memory 163 and a texture memory 171. The machine code shader programs 162 are transmitted from the GPU driver 118 to GPU local memory 160. The machine code shader programs 162 may include, without limitation, the machine code vertex shader program, the machine code geometry shader program, the machine code fragment shader program, or any number of variations of each. The buffer object memory 163 includes a uniform storage buffer 164, a texture buffer 166 and a vertex buffer 165 and a buffer load 167. The uniform storage buffer 164 stores one or more uniform variables, also called "uniforms." A uniform variable is held constant during a given invocation of the associated shader but may be altered between invocations. The texture buffer 166 stores data elements typically organized in one-dimensional arrays.

The texture memory 171 includes texture 172 and frame buffer 168. The texture 172 and the frame buffer 168 include at least one two-dimensional surface that is used to drive the display 170. The texture 172 and the frame buffer 168 may include more than one two-dimensional surfaces so that the GPU 150 can render to one two-dimensional surface while a second two-dimensional surface is used to drive the display 170. Data stored within the texture 172 and the frame buffer 168 is typically accessed with the assistance of application specific hardware that provides for a dimensional access view of the data. For example a two-dimensional surface may be addressed with the assistance of a hardware unit that transposes a horizontal and vertical surface location into a physical memory address that corresponds to the location.

The GPU 150 includes a vertex shader 152, a geometry shader 154 and a fragment shader 156 and a memory management unit (MMU) 158. As is well-known, the vertex shader 152 receives a sequence of one or more sets of vertex attributes, where each set of vertex attributes is typically associated with one vertex and one or more vertices are associated with a geometric primitive. The vertex shader 152 processes the vertex attributes, performing such operations as evaluating the vertex's position relative to the viewer and evaluating lighting equations to determine each vertex color. The vertex shader 152 may also use data from the buffer object memory 163 in the GPU local memory 160. For example, the vertex shader 152 may use data from the uniform storage buffer 164 or the texture buffer 166. The machine code vertex shader program executes on the vertex shader 152, imparting specific processing behavior according to specific requirements and specifications of the application program 112. The geometry shader 154 receives sets of processed vertices from the vertex shader 152. The geometry shader 154 performs per-primitive operations on vertices grouped into primitives such as triangles, lines, strips and points emitted by the vertex shader 152, enabling functionality such as shadow volume generation and procedural synthesis. The machine code geometry shader program executes on the geometry shader 154, imparting specific processing behavior according to specific requirements and specifications of the application program 112. A fixed-function rasterizer (not shown) that is situated between the geometry shader 154 and the fragment shader 156 scan converts an individual geometric primitive into a set of fragments with interpolated vertex attributes. The fragment shader 156 processes the fragments, each containing fragment data, which may include raster position, depth or interpolated vertex attributes, such as texture coordinates, opacity, and other relevant per-pixel data, to produce final pixel values. The final pixel values are stored in the frame buffer 168 by a fixed-function raster operations unit (not shown) that also performs operations such as depth and stencil tests as well as any blending of the final pixel values with values currently stored in the frame buffer. The machine code fragment shader program executes on the fragment shader 156, resulting in specific processing behavior according to specific requirements and specifications of the application program 112.

The MMU 158 is configured to map virtual addresses into physical addresses. The MMU 158 includes a set of page table entries (PTEs) used to map a virtual address to a physical address of a page, and optionally includes a cache. The MMU 158 may include address translation lookaside buffers (TLB) or caches which may reside within the GPU 150. The physical address is processed to distribute surface data access locality to allow efficient request interleaving among partition units. The cache may be used to determine whether of not a request for a cache line is a hit or miss, improving the performance of the MMU.

The display 170 is an output device capable of emitting a visual image corresponding to an input data signal. For example, the display may be built using a cathode ray tube (CRT) monitor, a liquid crystal display, or any other suitable display system. The input data signal to the display 170 is typically generated by scanning out the contents of one or more frames of image data that is stored in the frame buffer 168.

Figure 2:
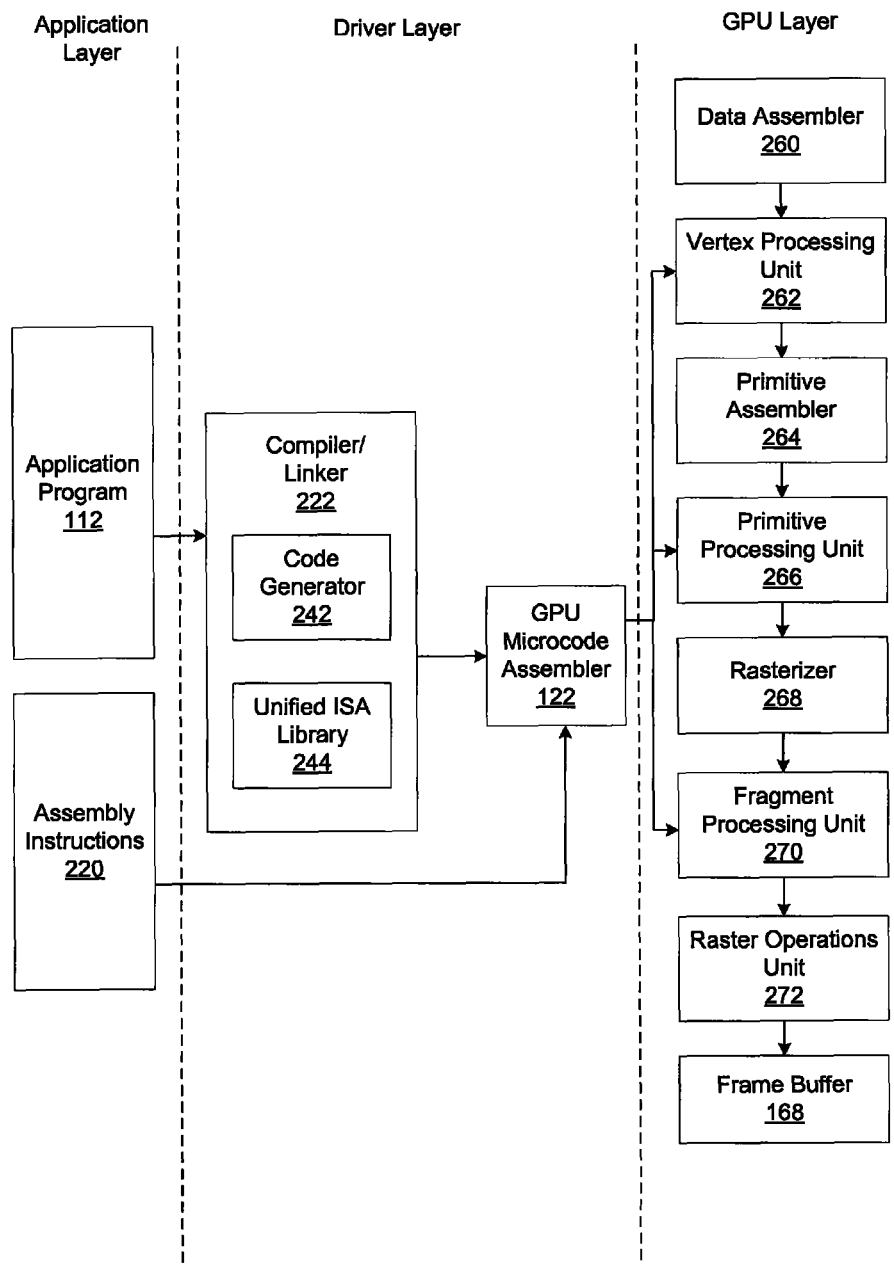
FIG. 2 is a conceptual diagram of a shader programming model, according to one embodiment of the present invention.

FIG. 2 is a conceptual diagram of a shader programming model 200, according to one embodiment of the present invention. As shown, the shader programming model 200 includes the application program 112, which transmits high-level shader programs to the GPU driver 118. The GPU driver 118 then generates machine code programs that are used within the GPU 150 to specify shader behavior within the different processing domains of the GPU 150.

The high-level shader programs transmitted by the application program 112 may include a high-level vertex shader program, a high-level geometry shader program and a high-level fragment shader program. Each of the high-level shader programs is transmitted through an API to the compiler/linker 222 within the GPU driver 118. The compiler/linker 222 compiles the high-level shader programs 114 into assembly language program objects.

Under shader programming model 200, domain-specific shader programs, such as high-level vertex shader program, high-level geometry shader program, and high-level fragment shader program, are compiled using a common instruction set target, supported by unified instruction set architecture (ISA) library 244. With the common instruction set, application developers can compile high-level shader programs in different domains using a core set of instructions having the same syntax and consequently should expect faster compile times for such shader programs. One example of this common ISA is supported by the Unified Instruction Set Architecture ("ISA") developed by NVIDIA Corporation, Santa Clara, U.S.A.

Compiler/linker 222, which includes code generator 242 and unified ISA library 244, provides cross-domain linking capabilities. Specifically, compiler/linker 222 translates the high-level shader programs designated for different domains (e.g., the high-level vertex shader program, the high-level geometry shader program, and the high-level fragment shader program), which are written in high-level shading language, into distinct compiled software objects in the form of assembly code. Further, instead of sending these compiled objects of assembly code individually to separate GPU microcode assemblers (not shown), compiler/linker 222 also "links" the compiled assembly code to generate a single compiled/linked program object, also in the form of either assembly code or machine code. To link multiple compiled objects from different domains (also referred to as to "rendezvous"), compiler/linker 222 needs to reconcile the use of symbols across the domains. Specifically, there are generally two types of symbols, the first type being defined or exported symbols, and the second type being undefined or imported symbols. The first type of symbols broadly refers to functions or variables that are present in one compiled object (e.g., vertex shader assembly code) and should be made available for use by other compiled objects (e.g., geometry shader assembly code and/or fragment shader assembly code). The second type of symbols broadly refers to functions or variables that are called or referenced by one compiled object (e.g., vertex shader assembly code) but are not internally defined within this compiled object.

Additionally, compiler/linker 222 supports two types of linking, linking by name and linking by semantics. To illustrate linking by name, suppose Color is the name of a variable containing color values to be passed from the vertex shader program to the fragment shader program. Suppose also that Color is defined in this vertex shader program. In programming model 200, compiler/linker 222 facilitates the establishment and maintenance of the input/output relationship between high-level vertex shader program 220 and, for example, high-level geometry shader program 222 without requiring any explicit variables-to-hardware mappings in the shader programs, so long as the two shader programs use the name Color consistently. To link by semantics, on the other hand, the variable names are not required to be the same. While the OpenGL Shading Language (GLSL) generally does not link by semantics, an exception within GLSL is where built-in names have semantic association. For example, gl_Position refers to the position of a vertex, gl_Color refers to the color of a fragment and gl_TexCoord[0] refers to the first of a set of texture coordinates for a vertex or fragment. A second use of linking by semantics occurs with the use of BindFragDataLocationNV( ) described in greater detail herein. Suppose high-level vertex shader program 220 uses a variable with the name of Vertex Color for storing the color type X to be passed to high-level geometry shader program 220, and high-level geometry shader program 222 uses a variable with the name of Geometry Color for receiving the color type X. In this scenario, compiler/linker 222 is still capable of establishing and maintaining the input/output relationship between high-level vertex shader program 220 and high-level geometry shader program 222, so long as Vertex Color and Geometry Color are assigned the same semantics corresponding to the color type X.

The program objects are transmitted to the GPU microcode assembler 122, which generates machine code programs, including a machine code vertex shader program, a machine code geometry shader program and a machine code fragment shader program. The machine code vertex shader program is transmitted to a vertex processing unit 262 for execution. Similarly, the machine code geometry shader program is transmitted to a primitive processing unit 266 for execution and the machine code fragment shader program is transmitted to a fragment processing unit 270 for execution.

Shader programs can also be transmitted by the application program 112 via assembly instructions 220. The assembly instructions 220 are transmitted directly to the GPU microcode assembler 122 which then generates machine code programs, including a machine code vertex shader program, a machine code geometry shader program and a machine code fragment shader program, as previously described herein.

A data assembler 260 and the vertex processing unit 262 function as the vertex shader 152 of FIG. 1. The data assembler 260 is a fixed-function unit that collects vertex data for high-order surfaces, primitives, and the like, and outputs the vertex data to vertex processing unit 262. The data assembler 260 may gather data from buffers stored within system memory 110 and GPU local memory 160 as well as from API calls from the application program 112 used to specify vertex attributes. The vertex processing unit 262 is a programmable execution unit that is configured to execute a machine code vertex shader program, transforming vertex data as specified by the vertex shader programs. For example, vertex processing unit 262 may be programmed to transform the vertex data from an object-based coordinate representation (object space) to an alternatively based coordinate system such as world space or normalized device coordinates (NDC) space. The vertex processing unit 262 may read vertex attribute data directly from the GPU local memory 160 via the buffer load mechanism described below. The vertex processing unit 262 may read texture map data as well as uniform data that is stored in GPU local memory 160 through an interface (not shown) for use in processing the vertex data. The vertex shader 152 represents the vertex processing domain of the GPU 150.

A primitive assembler 264 and the primitive processing unit 266 function as the geometry shader 154. A second primitive assembler (not shown) may be included subsequent to the primitive processing unit 266 in the data flow through the GPU 150. The primitive assembler 264 is fixed-function unit that receives processed vertex data from vertex processing unit 262 and constructs graphics primitives, e.g., points, lines, triangles, or the like, for processing by primitive processing unit 266. In prior art systems, the primitive processing unit performs well-known, fixed-function viewport operations such as clipping, projection and related transformations on the incoming vertex data. In the GPU 150, the primitive processing unit 266 is a programmable execution unit that is configured to execute machine code geometry shader program to process graphics primitives received from the primitive assembler 264 as specified by the geometry shader program. For example, in addition to well-known viewport operations, the primitive processing unit 266 may be programmed to subdivide the graphics primitives into one or more new graphics primitives and calculate parameters, such as plane equation coefficients, that are used to rasterize the new graphics primitives. The primitive processing unit 266 may read data directly from the GPU local memory 160 via the buffer load mechanism described below. Additionally, the primitive processing unit 266 may read texture map data that is stored in GPU local memory 160 through an interface (not shown) for use in processing the geometry data. The geometry shader 154 represents the geometry processing domain of the GPU 150. The primitive processing unit 266 outputs the parameters and new graphics primitives to a rasterizer 268. The rasterizer 268 is a fixed-function unit that scan converts the new graphics primitives and outputs fragments and coverage data to the fragment processing unit 270.

The fragment processing unit 270 performs the functions of the fragment shader 156 of FIG. 1. The fragment processing unit 270 is a programmable execution unit that is configured to execute machine code fragment shader programs to transform fragments received from rasterizer 268 as specified by the machine code fragment shader program 128. For example, the fragment processing unit 270 may be programmed to perform operations such as perspective correction, texture mapping, shading, blending, and the like, to produce shaded fragments that are output to a raster operations unit 272. The primitive processing unit 266 may read data directly from the GPU local memory 160 via the buffer load mechanism described below. Additionally, the fragment processing unit 270 may read texture map data as well as uniform data that is stored in local memory 160 through an interface (not shown) for use in processing the fragment data. The raster operations unit 272 optionally performs fixed-function computations such as near and far plane clipping and raster operations, such as stencil, z test and the like, and outputs pixel data as processed graphics data for storage in a buffer in the GPU local memory 160, such as the frame buffer 168.

Figure 3:
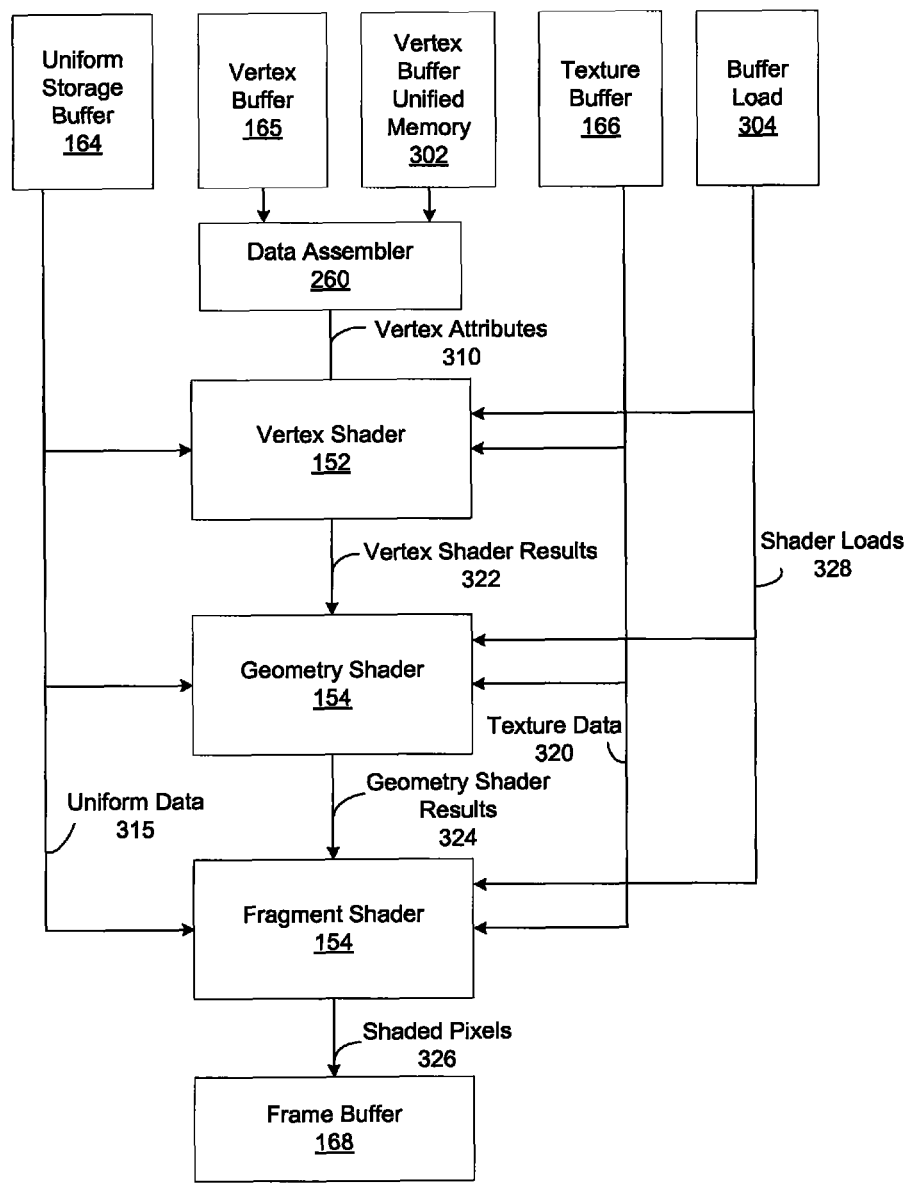
FIG. 3 is a data flow diagram of a programmable graphics pipeline residing within the GPU of FIG. 1, according to one embodiment of the present invention.

FIG. 3 is a data flow diagram of a programmable graphics pipeline residing within the GPU of FIG. 1, according to one embodiment of the present invention. The vertex shader 152, the geometry shader 154 and the fragment shader 156 of FIG. 1 are configured according to the shader programming model 200 of FIG. 2.

The vertex shader 152 executes the machine code vertex shader program in order to process a stream of vertex attributes 310 received from the vertex buffer 165 or a vertex buffer unified memory 302 via the data assembler 260. The vertex attributes 310 received from the vertex buffer unified memory 302 are attached to a vertex state set in an application context of the application program 112. The vertex shader 152 may access data from additional sources, such as uniform data 315 from the uniform storage buffer 164, texture data 320 from the texture buffer 166 and via the buffer load mechanism 304. The vertex shader results 322 are transmitted to the geometry shader 154, which processes the vertex shader results 322 according to the machine code geometry shader program. The geometry shader 154 may access data from additional sources, such as uniform data 315 from the uniform storage buffer 164, texture data 320 from the texture buffer 166 and via the buffer load mechanism 304. The geometry shader results 324 are transmitted to the fragment shader 156. The fragment shader 156 executes the machine code fragment shader program in order to process the geometry shader results 324. The fragment shader 156 may access data from additional sources, such as uniform data 315 from the uniform storage buffer 164, texture data 320 from the texture buffer 166 and via the buffer load mechanism 304. The output of the fragment shader 156 includes a stream of shaded pixels 326 that are written to the frame buffer 168.

Accessing a Buffer Object Via a Virtual GPU Address

The present invention is a mechanism for accessing buffer objects within the buffer object memory 163 via a virtual GPU address assigned to those buffer objects. As described in greater detail below with respect to FIG. 5, vertex buffer objects can be accessed via the vertex buffer unified memory 302 in a state-based implementation. In addition, as described in greater detail below with respect to FIG. 6, buffer objects can be accessed directly by a shader program executing on the GPU 150 using high-level language pointers or assembly language load instructions.

Figure 4:
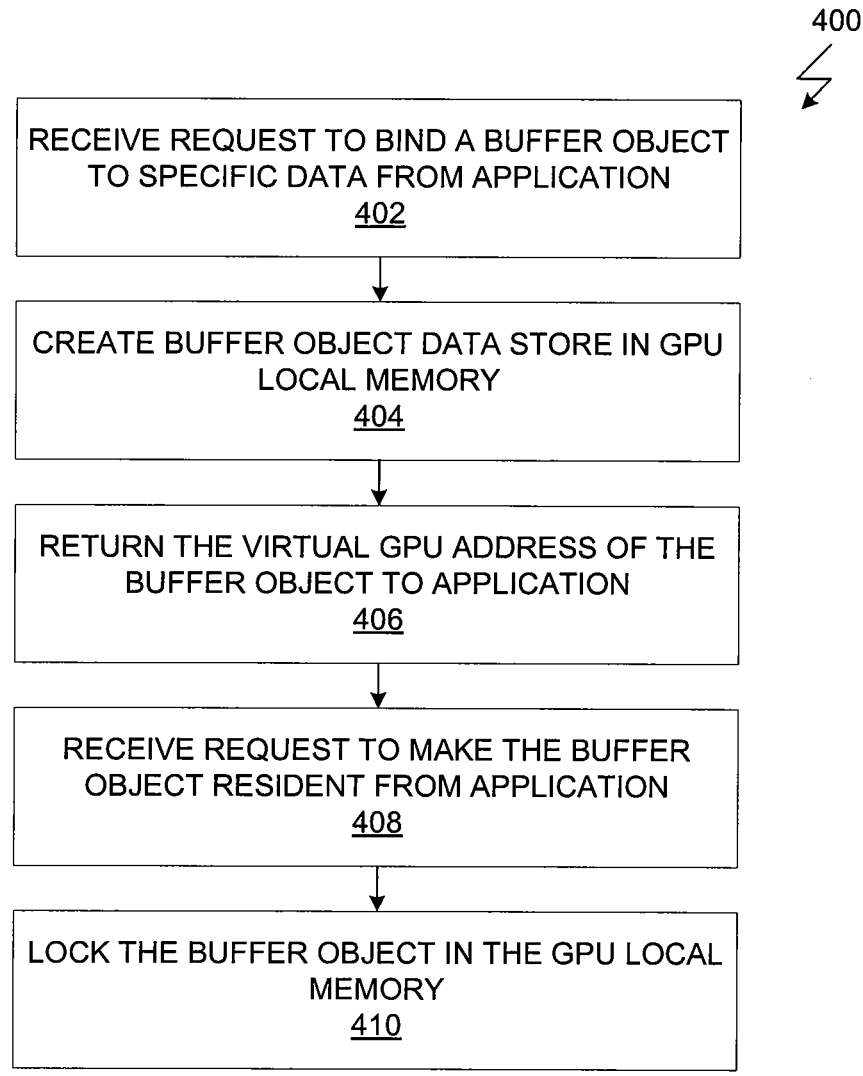
FIG. 4 is a flow diagram of method steps for making a buffer object resident in the buffer object memory, according to one embodiment of the present invention.

FIG. 4 is a flow diagram of method steps for making a buffer object resident in the buffer object memory, according to one embodiment of the present invention. Although the method steps are described in conjunction with the systems for FIGS. 1-3, persons skilled in the art will understand that any system configured to perform the method steps, in any order, is within the scope of the invention.

The method 400 begins at step 402, where the GPU driver 118 receives a request from the application program 112 to bind a buffer object within the buffer object memory 163 of the GPU local memory 160 to a buffer object identifier. At step 404, the GPU driver 118 creates the buffer object based on the request received from the application program 112. At step 406, based on a request received from the application program 112, the GPU driver 118 returns the virtual GPU address of the of the buffer object created in the specific buffer. The virtual GPU address remains valid for the lifetime of the buffer object. At step 408, the GPU driver 118 receives a request from the application program 112 to make the buffer object resident such that it is guaranteed to be accessible to the GPU 150. In response, at step 410, the GPU driver 118 locks the buffer object in the buffer object memory 163.

In one embodiment, the GPU driver 118 locks buffer objects by binding the buffer objects to the context of the application program 112 and storing a list of all the currently bound buffer objects. A second list of all buffer objects that have been locked since the last command buffer submission, including those that were locked at the time of the last submission, is also maintained. When a user-mode driver fills out the command buffer with the commands received from the application program 112, the allocation list of the command buffer is populated with each buffer object in this second list of buffer objects stored in the GPU driver 118. Importantly, a GPU address associated with a buffer object is valid in all contexts that the buffer object belongs to. An alternate embodiment would only store a list of currently bound buffer objects, and their memory would always be accessible to the GPU.

In an alternate embodiment of the present invention, the GPU address associated with a buffer object is also a CPU address within a CPU address space.

Figure 5:
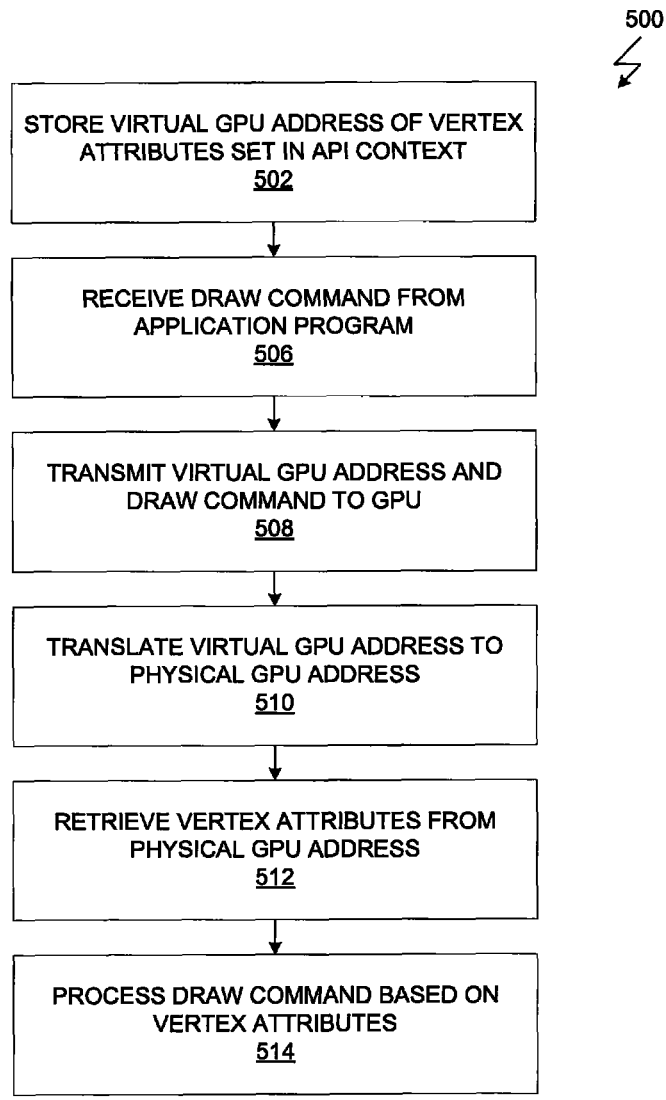
FIG. 5 is a flow diagram of method steps for loading vertex attributes via the vertex buffer unified memory using the GPU address of the buffer object, according to one embodiment of the present invention.

FIG. 5 is a flow diagram of method steps for loading vertex attributes via the vertex buffer unified memory 302 using the GPU address of the buffer object, according to one embodiment of the present invention. Although the method steps are described in conjunction with the systems for FIGS. 1-3, persons skilled in the art will understand that any system configured to perform the method steps, in any order, is within the scope of the invention.

The method 500 begins at step 502, where the GPU driver 118 stores within the application context a set of virtual GPU address within vertex buffer objects which are set through the API by the application program 112. In one embodiment, the application program 112 sets up to sixteen virtual GPU addresses within the vertex buffer objects. At step 506, the GPU driver 118 receives a draw command from the application 112 and, in response, at step 508, transmits the virtual GPU addresses within the vertex buffer objects and the draw command to the GPU 150 for further processing. Importantly, the GPU driver 118 does not have to access the buffer objects within the driver data 120 to transmit the virtual GPU addresses to the GPU 150.

At step 510, the GPU 150 translates the virtual GPU addresses of the vertex buffer objects to physical GPU addresses within the buffer object memory 163. At step 512, the GPU 150 retrieves the vertex attributes from the physical GPU addresses within the buffer object memory 163. At step 514, the GPU 150 processes the draw command received from the GPU driver 118 based on the vertex attributes retrieved from the buffer object memory 163.

Figure 6:
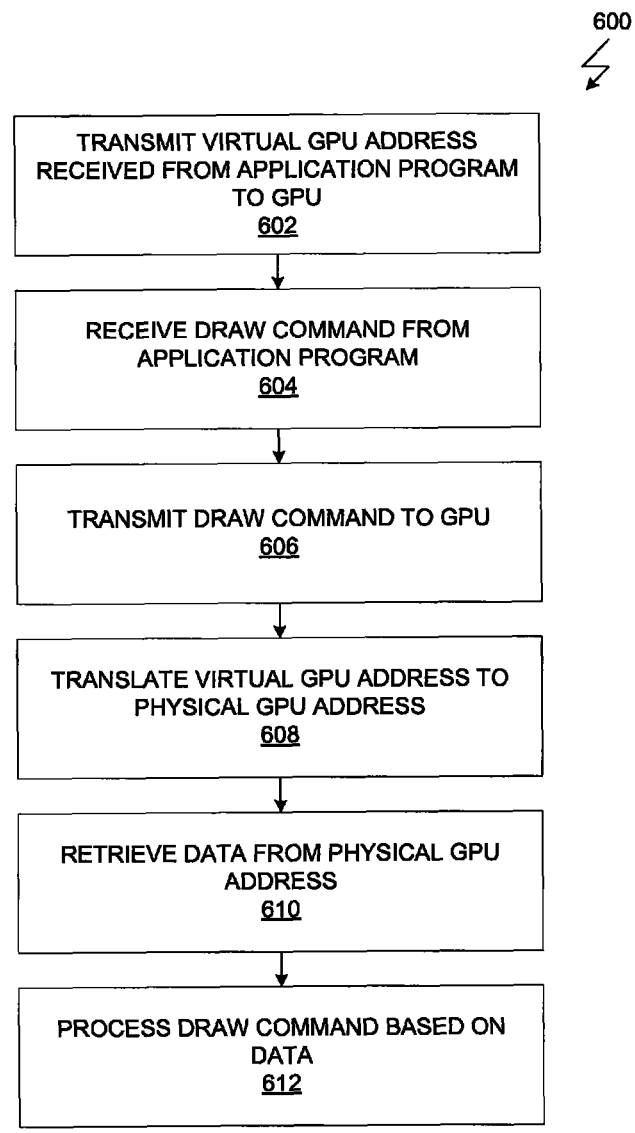
FIG. 6 is a flow diagram of method steps for loading data via the shader program using the GPU address of the buffer object, according to one embodiment of the present invention.

FIG. 6 is a flow diagram of method steps for loading data via the shader program using the GPU address of the buffer object, according to one embodiment of the present invention. Although the method steps are described in conjunction with the systems for FIGS. 1-3, persons skilled in the art will understand that any system configured to perform the method steps, in any order, is within the scope of the invention.

The method 600 begins at step 602, where the GPU driver 118 transmits virtual GPU addresses of buffer objects received from the application program 112 to the GPU 150. Importantly, the GPU driver 118 does not have to access the buffer objects within the driver data 120 to transmit the virtual GPU addresses to the GPU 150. At step 604, the GPU driver 118 receives a draw command from the application 112 and, in response, at step 606, transmits the draw command to the GPU 150 for further processing.

At step 608, in response to a high-level language pointer or an assembly language load instruction, the GPU 150 translates a virtual GPU address within a buffer object to a physical GPU address within the buffer object memory 163. At step 610, the GPU 150 retrieves the data from the physical GPU address within the buffer object memory 163. At step 612, the GPU 150 processes the draw command received from the GPU driver 118 based on the data retrieved from the buffer object memory 163.

Extensions to the OpenGL Shading Language (GLSL) and related APIs to support accessing buffer objects via virtual GPU addresses are discussed below. Persons skilled in the art will appreciate that the information in this section should be considered in conjunction with the current OpenGL 3.0 specification. Importantly, the extensions presented herein introduce two new OpenGL extensions: NV_shader_buffer_load for loading data associated with buffer objects via a shader program and NV_vertex_buffer_unified_memory for loading vertex attributes associated with vertex buffer objects via the vertex buffer unified memory.

The NV_shader_buffer_load extension provides a mechanism to read from a flat, 64-bit GPU address space from programs/shaders, to query GPU addresses of buffer objects at the API level, and to bind buffer objects to the context in such a way that they can be accessed via their GPU addresses in any shader stage. The intent is that applications can avoid re-binding buffer objects or updating constants between each Draw call and instead simply use a VertexAttrib (or TexCoord, or InstanceID, or . . . ) to "point" to the new object's state. In this way, one of the cheapest "state" updates (from the CPU's point of view) can be used to effect a significant state change in the shader similarly to how a pointer change may on the CPU. At the same time, this relieves the limits on how many buffer objects can be accessed at once by shaders, and allows these buffer object accesses to be exposed as C-style pointer dereferences in the shading language.

As a very simple example, imagine packing a group of similar constants into a single buffer object and pointing your program at object <i> by setting glVertexAttribl1iEXT(attrLoc, i);" and using a shader as such:

```
struct MyObjectType {
    mat4x4 modelView;
    vec4 materialPropertyX;
    // etc.
};
uniform MyObjectType *allObjects;
in int objectID; // bound to attrLoc
...
mat4x4 thisObjectsMatrix=allObjects[objectID].modelView;
// do transform, shading, etc.
```

This is beneficial in much the same way that texture arrays allow choosing between similar, but independent, texture maps with a single coordinate identifying which slice of the texture to use. It also resembles instancing, where a lightweight change (incrementing the instance ID) can be used to generate a different and interesting result, but with additional flexibility over instancing because the values are app-controlled and not a single incrementing counter.

Dependent pointer fetches are allowed so more complex scene graph structures can be built into buffer objects providing significant new flexibility in the use of shaders. Another example, shown below, performs dependent fetches into many buffer objects:

```
GenBuffers(N, dataBuffers);
GenBuffers(1, &pointerBuffer);
GLuint64EXT gpuAddrs[N];
for (i=0; i<N; ++i) {
    BindBuffer(target, dataBuffers[i]);
    BufferData(target, size[i], myData[i], STATIC_DRAW);
    // get the address of this buffer and make it resident.
    GetBufferParameterui64vNV(target, BUFFER_GPU_ADDRESS, gpuaddrs[i]);
    MakeBufferResidentNV(target, READ_ONLY);
}
GLuint64EXT pointerBufferAddr;
BindBuffer(target, pointerBuffer);
BufferData(target, sizeof(GLuint64EXT)*N, gpuAddrs, STATIC_DRAW);
GetBufferParameterui64vNV(target, BUFFER_GPU_ADDRESS, &pointerBufferAddr);
MakeBufferResidentNV(target, READ_ONLY);
// now in the shader, we can use a double indirection
vec4 **ptrToBuffers=pointerBufferAddr;
vec4 *ptrToBufferl=ptrToBuffers[i];
```

Below are the new procedures and functions that are introduced in the application interface for NV_shader_buffer_load extension.

```
void MakeBufferResidentNV(enum target, enum access);
void MakeBufferNonResidentNV(enum target);
boolean IsBufferResidentNV(enum target);
void MakeNamedBufferResidentNV(uint buffer, enum access);
void MakeNamedBufferNonResidentNV(uint buffer);
boolean IsNamedBufferResidentNV(uint buffer);
void GetBufferParameterui64vNV(enum target, enum pname, uint64EXT *params);
void GetNamedBufferParameterui64vNV(uint buffer, enum pname, uint64EXT *params);
void GetIntegerui64vNV(enum value, uint64EXT *result);
void Uniformui64NV(int location, uint64EXT value);
void Uniformui64vNV(int location, sizei count, const uint64EXT *value);
void GetUniformui64vNV(uint program, int location, uint64EXT *params);
void ProgramUniformui64NV(uint program, int location, uint64EXT value);
void ProgramUniformui64vNV(uint program, int location, sizei count, const uint64EXT *value);
```

The data store of a buffer object may be made accessible to the GL via shader buffer loads by calling:

void MakeBufferResidentNV(enum target, enum access);

<access> may only be READ_ONLY, but is provided for future extensibility to indicate to the driver that the GPU may write to the memory. <target> may be any of the buffer targets accepted by BindBuffer. While the buffer object is resident, it is legal to use GPU addresses of the range [BUFFER_GPU_ADDRESS, BUFFER_GPU_ADDRESS+BUFFER_SIZE) in any shader stage. The data store of a buffer object may be made inaccessible to the GL via shader buffer loads by calling:

void MakeBufferNonResidentNV(enum target);
A buffer is also made non-resident implicitly as a result of being respecified via BufferData or being deleted. <target> may be any of the buffer targets accepted by BindBuffer. The function void GetBufferParameterui64vNV(enum target, enum pname, uint64EXT *params) may be used to query the GPU address of a buffer object's data store. This address remains valid until the buffer object is deleted, or when the data store is respecified via BufferData. The address "zero" is reserved for convenience, so no buffer object will ever have an address of zero.

Shaders executing within the GPU may also load from buffer object memory by dereferencing pointer variables. Pointer variables are 64-bit unsigned integer values referring to the GPU addresses of data stored in buffer objects made resident by MakeBufferResidentNV. The GPU addresses of such buffer objects may be queried using GetBufferParameterui64vNV with a <pname> of BUFFER_GPU_ADDRESS_NV.

When a shader dereferences a pointer variable, data are read from buffer object memory according to the following rules:

- Data of type "bool" are stored in memory as one uint-typed value at the specified GPU address. All non-zero values correspond to true, and zero corresponds to false.
- Data of type "int" are stored in memory as one int-typed value at the specified GPU address.
- Data of type "uint" are stored in memory as one uint-typed value at the specified GPU address.
- Data of type "float" are stored in memory as one float-typed value at the specified GPU address.
- Vectors with <N> elements with any of the above basic element types are stored in memory as <N> values in consecutive memory locations beginning at the specified GPU address, with components stored in order with the first (X) component at the lowest offset. The data type used for individual components is derived according to the rules for scalar members above.
- Data with any pointer type are stored in memory as a single 64-bit unsigned integer value at the specified GPU address.
- Column-major matrices with <C> columns and <R> rows (using the type "mat<C>x<R>", or simply "mat<C>" if <C>==<R>) are treated as an array of <C> floating-point column vectors, each consisting of <R> components. The column vectors will be stored in order, with column zero at the lowest offset. The difference in offsets between consecutive columns of the matrix will be referred to as the column stride, and is constant across the matrix.
- Row-major matrices with <C> columns and <R> rows (using the type "mat<C>x<R>", or simply "mat<C>" if <C>==<R>) are treated as an array of <R> floating-point row vectors, each consisting of <C> components. The row vectors will be stored in order, with row zero at the lowest offset. The difference in offsets between consecutive rows of the matrix will be referred to as the row stride, and is constant across the matrix.
- Arrays of scalars, vectors, pointers, and matrices are stored in memory by element order, with array member zero at the lowest offset. The difference in offsets between each pair of elements in the array in basic machine units is referred to as the array stride, and is constant across the entire array.

When dereferencing a pointer to a structure, the individual members within the structure are laid out in memory in monotonically increasing order based on their location in the structure declaration. Each structure member has a base offset and a base alignment, from which an aligned offset is computed by rounding the base offset up to the next multiple of the base alignment. The base offset of the first member of a structure is taken from the aligned offset of the structure itself. The base offset of all other structure members is derived by taking the offset of the last basic machine unit consumed by the previous member and adding one. Each structure member is stored in memory at its aligned offset.

(1) If the member is a scalar consuming <N> basic machine units, the base alignment is <N>.

(2) If the member is a two- or four-component vector with components consuming <N> basic machine units, the base alignment is 2<N> or 4<N>, respectively.

(3) If the member is a three-component vector with components consuming <N> basic machine units, the base alignment is 4<N>.

(4) If the member is an array of scalars or vectors, the base alignment and array stride are set to match the base alignment of a single array element, according to rules (1), (2), and (3). The array may have padding at the end; the base offset of the member following the array is rounded up to the next multiple of the base alignment.

(5) If the member is a column-major matrix with <C> columns and <R> rows, the matrix is stored identically to an array of <C> column vectors with <R> components each, according to rule (4).

(6) If the member is an array of <S> column-major matrices with <C> columns and <R> rows, the matrix is stored identically to a row of <S>*<C> column vectors with <R> components each, according to rule (4).

(7) If the member is a row-major matrix with <C> columns and <R> rows, the matrix is stored identically to an array of <R> row vectors with <C> components each, according to rule (4).

(8) If the member is an array of <S> row-major matrices with <C> columns and <R> rows, the matrix is stored identically to a row of <S>*<R> row vectors with <C> components each, according to rule (4).

(9) If the member is a structure, the base alignment of the structure is <N>, where <N> is the largest base alignment value of any of its members. The individual members of this sub-structure are then assigned offsets by applying this set of rules recursively, here the base offset of the first member of the sub-structure is equal to the aligned offset of the structure. The structure may have padding at the end; the base offset of the member following the sub-structure is rounded up to the next multiple of the base alignment of the structure.

(10) If the member is an array of <S> structures, the <S> elements of the array are laid out in order, according to rule (9).

The rules, according to which data from the buffer objects is retrieved is advantageous because the application program can infer the structure of the buffer object based on these rules. Second, the rules are defined in such a way that the alignment of a field within a structure matches the natural alignment of that field's type. The compiler then knows that if it has a pointer to a vec4 (a 16-byte type), it can use an optimized 16-byte load instruction that requires 16-byte alignment, even if that vec4 was a field within a structure. Other possible rules, such as packing the structure as tightly as possible, wouldn't satisfy this. Notably, the Direct3D rules for constant buffers don't satisfy this.

The intent of the NV_vertex_buffer_unified_memory extension is to enable a way for the application to specify vertex attrib state that alleviates the overhead of object binds and driver memory management. Below are the new procedures and functions that are introduced in the application interface for NV_vertex_buffer_unified_memory extension:

void BufferAddressRangeNV(enum pname, uint index, uint64EXT address, sizeiptr length)
    void VertexFormatNV(int size, enum type, sizei stride);
    void NormalFormatNV(enum type, sizei stride);
    void ColorFormatNV(int size, enum type, sizei stride);
    void IndexFormatNV(enum type, sizei stride);
    void TexCoordFormatNV(int size, enum type, sizei stride);
    void EdgeFlagFormatNV(sizei stride);
    void SecondaryColorFormatNV(int size, enum type, sizei stride);
    void FogCoordFormatNV(enum type, sizei stride);
    void VertexAttribFormatNV(uint index, int size, enum type, boolean normalized, sizei stride);
    void VertexAttribIFormatNV(uint index, int size, enum type, sizei stride);
    void GetIntegerui64i_vNV(enum value, uint index, uint64EXT resultfl);

While VERTEX_ATTRIB_ARRAY_UNIFIED_NV is enabled, the rendering commands ArrayElement, DrawArrays, DrawElements, DrawRangeElements, MultiDrawArrays, DrawArraysInstanced, and DrawElementsInstanced, as well as any future commands that operate on the same vertex attrib state as these commands, operate as previously defined, except that data for enabled vertex and attrib arrays are sourced from GPU addresses specified by the command:

void BufferAddressRangeNV(enum pname, uint index, uint64EXT address, sizeiptr length);

where <pname> is VERTEX_ARRAY_ADDRESS_NV, NORMAL_ARRAY_ADDRESS_NV, COLOR_ARRAY_ADDRESS_NV, INDEX_ARRAY_ADDRESS_NV, EDGE_FLAG_ARRAY_ADDRESS_NV, SECONDARY_COLOR_ARRAY_ADDRESS_NV, or FOG_COORD_ARRAY_ADDRESS_NV and <index> is ignored, or <pname> is TEXTURE COORDARRAYADDRESS NV and <index> is the texture unit, or <pname> is VERTEX_ATTRIB_ARRAY_ADDRESS_NV and <index> identifies the generic vertex attribute whose address is being specified. <address> specifies the GPU address from which arrays will be sourced, and addresses beyond and including (<address>+<length>) will return undefined values. If the address range of an enabled vertex attrib does not belong to a buffer object that is resident at the time of the Draw, undefined results, possibly including program termination, may occur.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

Another embodiment of the invention may be implemented as a program product deployed for use over a network. In such an embodiment, the program product may be accessed via a web browser.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

We claim:

1. A computer-implemented method for accessing, from within a graphics processing unit (GPU), data objects stored in a memory accessible by the GPU, the method comprising:
    creating a data object in the memory based on a first command received from an application program;
    transmitting an address associated with the data object to the application program for providing data associated with different draw commands to the GPU, wherein the data object is a vertex buffer object and the data associated with different draw commands includes one or more vertex attributes or vertex indices;
    binding the address associated with the data object to an application program context of the application program based on a second command received from the application program;
    receiving a first draw command and the address associated with the data object from the application program; and
    transmitting the first draw command and the address associated with the data object to the GPU for processing, wherein the first draw command includes one or more additional addresses associated with one or more additional data objects bound to the application program context of the application program, wherein the addresses associated with the data objects are virtual memory addresses, and wherein a memory management unit (MMU) within the GPU translates the addresses associated with the data objects to physical memory addresses.

2. The method of claim 1, wherein the GPU retrieves the data object from the memory based on the address associated with the data object and processes the first draw command based on the retrieved data object.

3. The method of claim 2, wherein a multi-level on-chip cache hierarchy is used to optimize the retrieval of the data object from the memory.

4. The method of claim 1, wherein the application program transmits the address associated with the data object by setting state in the application program context.

5. The method of claim 4, wherein fixed-function hardware within the GPU reads the state in the application program context and retrieves the data object from the memory based on the address specified in the state.

6. The method of claim 1, wherein a graphics shader within the GPU retrieves the data object from the memory via an assembly load instruction.

7. The method of claim 1, wherein a graphics shader within the GPU retrieves the data object from the memory via a high-level shader language pointer.

8. The method of claim 1, wherein the address associated with the data object is static for the lifetime of the data object.

9. The method of claim 1, wherein the application program transmits a command to make the data object resident in memory such that the GPU is guaranteed access to the data object.

10. The method of claim 9, wherein the step of making the data object resident comprises adding the data object to an allocation list that specifies a list of data objects currently associated with the application program context.

11. The method of claim 1, wherein the data object stores one or more constants necessary for processing the first draw command.

12. The method of claim 1, wherein the data object stores scene graph information.

13. The method of claim 1, wherein the data object stores a different address from which data is to be retrieved.

14. The method of claim 1, wherein an unlimited number of data objects within the memory can be accessed via a single command transmitted by the application program or from a single instruction in a graphics shader within the GPU.

15. The method of claim 1, wherein the GPU only uses the address associated with the data object to access the data object within the memory.

16. The method of claim 1, wherein a shader compiler determines the layout of the data object in memory according to one or more rules.

17. A non-transitory computer-readable storage medium storing instructions that, when executed by a processor, cause the processor to enable the access, from within a graphics processing unit (GPU), data objects stored in a memory accessible by the GPU, by performing the steps of:
   creating a data object in the memory based on a first command received from an application program;
   transmitting an address associated with the data object to the application program for providing data associated with different draw commands to the GPU, wherein the data object is a vertex buffer object and the data associated with different draw commands includes one or more vertex attributes or vertex indices;
   binding the address associated with the data object to an application program context of the application program based on a second command received from the application program;
   receiving a first draw command and the address associated with the data object from the application program; and
   transmitting the first draw command and the address associated with the data object to the GPU for processing, wherein the first draw command includes one or more additional addresses associated with one or more additional data objects bound to the application program context of the application program, wherein the addresses associated with the data objects are virtual memory addresses, and wherein a memory management unit (MMU) within the GPU translates the addresses associated with the data objects to physical memory addresses.

18. The non-transitory computer-readable storage medium of claim 17, wherein the GPU retrieves the data object from the memory based on the address associated with the data object and processes the first draw command based on the retrieved data object.

19. A computer system, comprising:
   a central processing unit (CPU),
   a graphics processing unit (GPU), and
   a memory storing a graphics driver configured to:
      create a data object in the memory based on a first command received from an application program;
      transmit an address associated with the data object to the application program for providing data associated with different draw commands to the GPU, wherein the data object is a vertex buffer object and the data associated with different draw commands includes one or more vertex attributes or vertex indices;
      bind the address associated with the data object to an application program context of the application program based on a second command received from the application program;
      receive a first draw command and the address associated with the data object from the application program; and
      transmit the first draw command and the address associated with the data object to the GPU for processing, wherein the first draw command includes one or more additional addresses associated with one or more additional data objects bound to the application program context of the application program, wherein the addresses associated with the data objects are virtual memory addresses, and wherein a memory management unit (MMU) within the GPU translates the addresses associated with the data objects to physical memory addresses.

\* \* \* \* \*